United States Patent Office 3,464,991
Patented Sept. 2, 1969

3,464,991
11-AMINOALKYL-5,11-DIHYDRO-10H-DI-BENZO[a,d]CYCLOHEPTEN-10-ONE
Walter Schindler and Hans Blattner, Riehen, and Armin Züst, Basel-Land, Switzerland, assignors to Geigy Chemical Corporation, Greenburgh, N.Y., a corporation of Delaware
No Drawing. Filed Nov. 21, 1966, Ser. No. 595,644
Claims priority, application Switzerland, Nov. 26, 1965, 16,346/65
Int. Cl. C07d *29/10;* A61k *27/00*
U.S. Cl. 260—268                                   11 Claims

ABSTRACT OF THE DISCLOSURE

Substituted 11 - aminoalkyl-5,11-dihydro-10H-dibenzo [a,d]cyclohepten-10-ones such as 11-(3-methylaminopropyl) - 5,11-dihydro-10H-dibenzo[a,d]cyclohepten-10-one, and their salts have antidepressant properties.

DETAILED DESCRIPTION

The present invention relates to new tricyclic amines and acid addition salts therof, processes for their production, compositions which contain the new compounds as well as the use thereof. The new tricyclic amines and their acid addition salts exhibit valuable pharmacological properties in living bodies, i.e. they are valuable compounds for the treatment of mental disorders, especially depressions.

Compounds of the formula (numbering according to Chemical Abstracts)

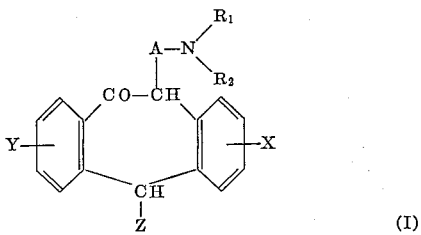

wherein

X and Y represent hydrogen or chlorine,
Z represents hydrogen or methyl,
A represents alkylene having 2 to 5 carbon atoms,
$R_1$ represents hydrogen or lower alkyl,
$R_2$ represents lower alkyl, or, optionally,
$R_1$ and $R_2$ together with the adjacent nitrogen atom represent a saturated heterocyclic radical having 5 to 7 ring members with lower alkylimino group as ring member, and also their pharmaceutically acceptable addition salts with inorganic or organic acids, have not been known hitherto. It has now been found that such compounds and their pharmaceutically acceptable addition salts with inorganic and organic acids have valuable central and peripheral pharmacological properties; they antagonize, e.g. the action of reserpine and tetrabenazine, potentiate anesthetics, inhibit the motility and have an antihistaminic action.

The new compounds can be used, for example, for the treatment of mental disorders, particularly of depressions; they are administered orally, rectally or, in the form of aqueous solutions of their salts, also parenterally. If desired, they can also be combined with other pharmaceuticals.

In the compounds of general Formula I, X and Y can be both the same or different and, as substituents of the benzene rings, they can be in the 1-, 2-, 3- or 4- or in the 6-, 7-, 8- or 9-positions, the 2- and 8-positions being preferred.

A is, for example, the ethylene, propylene, trimethylene, 1-methyltrimethylene, 2-methyltrimethylene or 2-ethyltrimethylene radical. $R_1$ and $R_2$ represent, for example, the methyl, ethyl, propyl, isopropyl or butyl group. If $R_1$ and $R_2$ together with the nitrogen atom form a heterocyclic radical then this is, e.g. the 1-pyrrolidinyl, piperidino, hexahydro-1H-azepin-1-y1, 4-methyl-1-piperazinyl or 4-methyl-hexahydro-1H-1,4-diazepin-1-yl radical.

Preferred compounds are those wherein A represents propylene, $R_1$ is hydrogen or lower alkyl, and $R_2$ is lower alkyl.

To produce the new compounds of Formula I, compounds of the formula

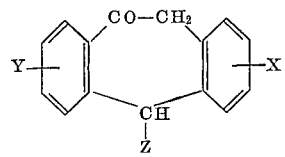

wherein X, Y and Z have the meanings given in Formula I, are condensed in the presence of a basic condensing agent with a reactive ester of an amino alcohol of the formula

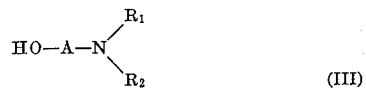

wherein A, $R_1$ and $R_2$ have the meanings given in Formula I, and, if desired, the compounds obtained are converted into addition salts with inorganic acids. Suitable condensing agents are, in particular, sodium amide, phenyl sodium, lithium amide, potassium amide, sodium, potassium, lithium, butyl lithium, phenyl lithium, sodium or lithium hydride. The reaction can be performed in the presence or absence of an inert organic solvent such as benzene, toluene, xylene, dimethyl formamide or dioxane.

In addition to the C-alkylation products corresponding to Formula I, depending on the starting materials, condensing agents and solvents, varying amounts of corresponding O-alkylation products are formed, i.e. 10-aminoalkoxy - 5H - dibenz[a,d]cycloheptenses substituted corresponding to the definitions of $R_1$, $R_2$, X, Y and Z. In the form of the enol ethers, these can easily be split into ketones of Formula II and amino alcohols of Formula III by treatment with acids, particularly by heating with aqueous mineral acids. In this cleavage, the ketones of Formula II precipitate as neutral bodies and they can be isolated and used again as starting materials for a new batch. Because of their water solubility and/or their low boiling point, the amino alcohols of Formula III which remain in solution with the reaction products of Formula I can easily be separated from these latter. Thus, following the condensation according to the invention, it is of advantage to perform a cleansing operation by treating the crude product with an acid, particularly by heating it with aqueous mineral acid, removing the precipitated ketone of Formula II and subsequently liberating the reaction product of Formula I by making the acid solution alkaline.

Examples of starting materials of the general Formula II are those compounds the radicals X and Y of which are the same as the radicals X and Y defined after Formula I. Of these compounds, 5,11-dihydro-10H-dibenzo-[a,d]cyclohepten-10-one and the corresponding 5-methyl compound are described in the literature [cf. N. J. Leonard, A. J. Kresge and Michinori Oki, J. Am. Soc. 77, 5078 (1955)]. Other compounds of this type can be produced analogously. 8-chloro-5,11-dihydro-10H-dibenzo[a,d]cyclohepten-10-one for example is obtained as follows: the starting material, o-(p-chlorobenzoyl)-benzoic acid is reduced with zinc dust to form α-(p-chlorophenyl)-o-toluic acid which is esterified with ethanol and concentrated sulphuric acid to form α-(p-chlorophenyl)-o-toluic acid ethyl ester; the ester is reduced with lithium aluminium hydride to form o-(p-chlorobenzyl)-benzyl alcohol which is converted with hydrobromic acid into α-bromo-o-(p-chlorobenzyl)-toluene; this bromide, with sodium cyanide, yields [α-(p-chlorophenyl)-o-tolyl]-acetonitrile which is hydrolysed with potassium hydroxide to form [α-(p-chlorophenyl)-o-toluic]-acetic acid; the acid obtained can be cyclised while splitting off water.

The halides in particular are used as reactive esters of amino alcohols of the general Formula III. Individually can be named: 2-dimethylaminoethyl chloride, 2-diethylaminoethyl chloride, 2-methylethylaminoethyl chloride, 2-dimethylaminopropyl chloride, 2-dimethylamino-1-methylethyl chloride, 3-dimethylaminopropyl chloride, 3-dimethylaminobutyl chloride, 4-dimethylaminobutyl chloride, 3-dimethylamino-2-methylpropyl chloride, 2-dipropylaminoethyl chloride, 2-(methyl-isopropylamino)-ethyl chloride, 1-(2-chlorethyl)-pyrrolidine, 1-(3-chloropropyl)-pyrrolidine, 1-(2-chlorethyl)-piperidine, 1-(3-chloropropyl)-piperidine, 1-(2-chlorethyl)-4-methyl piperazine, 1-(3-chloropropyl)-4-methyl piperazine, 1-(3-chloropropyl)-4-methyl-hexahydro-1H-1,4-diazepine and 1-(3-chloropropyl)-hexahydro-1H-azepine, as well as the corresponding bromides, iodides, methane sulphonic acid esters and p-toluene sulphonic acid esters.

Compounds of the general Formula I are obtained by a second process by hydrolysing a compound of the general formula

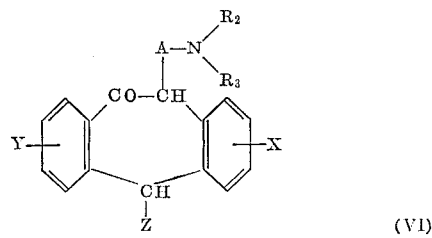

(VI)

wherein X, Y, Z, A and R$_2$ have the meanings given in Formula I and R$_3$ represents the cyano radical, an acyl radical of an organic acid, particularly a carboxylic acid radical, a radical of a monofunctional derivative of carbonic acid or of thiocarbonic acid, and, if desired, converting the reaction product into an addition salt with a pharmaceutically acceptable inorganic or organic acid. As acyl radical of a carboxylic acid, R$_3$ can be, e.g. a low alkanoyl radical or the benzoyl radical; as radical of a monofunctional derivative of carbonic or thiocarbonic acid it can be the chlorocarbonyl radical, a low alkoxycarbonyl or alkylthiocarbonyl radical, the phenoxycarbonyl or phenylthiocarbonyl radical. These radicals can be split off by acid or alkaline hydrolysis. Acid hydrolysis is performed preferably by treatment with an inorganic acid such as hydrochloric or sulphuric acid; alkaline hydrolysis is performed by means of an alkali hydroxide such as potassium hydroxide; both are performed at a raised temperature in a solvent. Such solvents are, e.g. low alkanols such as methanol, ethanol, also low glycols such as ethylene glycol or diethylene glycol or their low alkyl ethers such as diethylene glycol monomethyl ether.

Examples of starting materials of the general formula IV are those compounds the radicals X, Y, Z, A and R$_2$ of which are the same as the radicals which are explicitly mentioned after Formula I. To produce these compounds, for example, a compound of general Formula I the radical R$_1$ of which is a low alkyl group, or a corresponding compound the radical R$_1$ of which is a benzyl group, is used as starting material. Such types of compounds can be prepared, for example, by the first process. They are converted into compounds of the general Formula IV by reaction with a carboxylic acid halide or anhydride, particularly acetyl bromide, benzoyl bromide or acetic acid anhydride, also with a carbonic acid or thiocarbonic acid ester chloride, particularly chloroformic acid ethyl ester, chloroformic acid phenyl ester or with corresponding thiocarbonic acid derivatives or with phosgene or cyanogen bromide.

Starting materials of the general Formula IV may further be obtained by starting with compounds of the general Formula II and converting these into sodium derivatives and reacting such derivatives with reactive esters of compounds of the general formula

(IIa)

wherein A, R$_2$ and R$_3$ have the meanings given in Formula I and Formula IV, respectively.

The compounds of general Formula I obtained according to the process of the invention are then converted, if desired, into their addition salts with inorganic and organic acids in the usual way. For example, the acid or a solution of the acid desired as salt component is added to a solution of a compound of general Formula I in an organic solvent. Preferably organic solvents are chosen for the reaction in which the salt formed is difficultly soluble so that it can be isolated by filtration. Such solvents are, e.g. methanol, methanol/ether or ethanol/ether.

Instead of free bases, pharmaceutically acceptable acid addition salts, i.e. salts with those acids the anions of which in the usual dosages are pharmaceutically acceptable, can be used as compositions. Also, it is of advantage if the salts to be used in compositions crystallise well and are not or are only slightly hygroscopic. Hydrochloric acid, hydrobromic acid, sulphuric acid, phosphoric acid, methane sulphonic acid, ethane sulphonic acid, β-hydroxyethane sulphonic acid, acetic acid, malic acid, tartaric acid, citric acid, lactic acid, oxalic acid, succinic acid, fumaric acid, maleic acid, benzoic acid, salicylic acid, phenylacetic acid, mandelic acid and embonic acid, for example, can be used for salt formation with compounds of general Formula I.

As mentioned above, the new active substances are administered orally, rectally and parenterally. The daily dosages of the free bases or of pharmaceutically acceptable salts thereof vary between 10 and 800 mg. for adult patients. Suitable dosage units such as dragées (sugar coated tablets), tablets, suppositories or ampoules, preferably contain 5 to 50 mg. of an active substance according to the invention or a pharmaceutically acceptable salt thereof. Also, corresponding amounts of forms for administration not made up into single dosages, such as syrups, can be used.

Dosage units for oral administration preferably contain between 1–90% of a compound of Formula I or a pharmaceutically acceptable salt thereof as active substance.

They are produced by combining the active substance with, e.g., solid, pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate or polyethylene glycols of suitable molecular weights to form tablets or dragée cores. The latter are coated, e.g., with concentrated sugar solutions which can also contain, e.g., gum arabic, talcium and/or titanium dioxide, or with a lacquer dissolved in easily volatile oragnic solvents or mixtures of solvents. Dye-stuffs can be added to these coatings, e.g. to distinguish between varying dosages.

Other dosage units for oral administration are hard gelatin capsules and also soft ones made of gelatine and a softener such as glycerine. The former contain the active substance preferably in the form of a granulate in admixture with lubricants such as talcium or magnesium stearate and, optionally, stabilising agents such as sodium metabisulphite ($Na_2S_2O_5$) or ascorbic acid. In soft capsules, the active substance is preferably dissolved or suspended in suitable liquids such as liquid polyethylene glycols to which stabilising agents can also be added.

Examples of dosage units for rectal administration are suppositories and gelatine rectal capsules. The former consist of a combination of an active substance of the general Formula I or of a suitable salt thereof with a foundation of natural or synthetic triglycerides, e.g. cocoa butter, or of polyethylene glycols of suitable molecular weight, or of suitable higher fatty alcohols. The latter contain a combination of an active substance (or a suitable salt thereof) with polyethylene glycols of suitable molecular weight.

Ampoules for parenteral, particularly intramuscular, administration preferably contain a water soluble salt of an active substance in a concentration of, preferably 0.5–5%, in aqueous solution, optionally together with suitable stabilising agents and buffer substances.

The following prescriptions further illustrate the prodduction of tablets and dragées:

(a) 250 g. of 11 - (3 - methylaminopropyl)-5,11-dihydro - 10H-dibenz [a,d]cyclohepten-10-one hydrochloride are mixed with 175.80 g. of lactose and 169.70 g. of potato starch, the mixture is moistened with an alcoholic solution of 10 g. of stearic acid and granulated through a sieve. After drying, 160 g. of potato starch, 200 g. of talcum, 2.50 g. of magnesium stearate and 32 g. of colloidal silicium dioxide are mixed in and the mixture is pressed into 10,000 tablets each weighing 100 mg. and containing 25 mg. of active substance. If desired, the tablets may be grooved for better adaptation of the dosage.

(b) A granulate is produced from 250 g. of 8-chloro-11 - (3 - methylaminopropyl)-5,11-dihydro-10H-dibenzo [a,d]cyclohepten - 10 - one hydrochloride, 175.90 g. of lactose and the alcoholic solution of 10 g. stearic acid. After drying, the granulate is mixed with 56.60 g. of colloidal silicium dioxide, 165 g. of talcum, 20 g. of potato starch and 2.50 of magnesium stearate and the mixture is pressed into 10,000 dragée cores. These are then coated with a concentrated syrup of 502.28 g. of crystallised saccharose, 6 g. of shellac, 10 g. of gum arabic, 0.22 g. of dye-stuff and 1.5 g. of titanium dioxide and dried. The dragées obtained each weigh 120 mg. and contain 25 mg. of active substance.

As mentioned above the compounds defined in Formula I possess valuable pharmacological properties in living bodies. The pharmacological spectrum of these compounds indicates that they are useful for the treatment of various mental disorders, especially depressions and depressive phases of different somatic diseases. It has been found that the compounds: 11-(3-dimethylaminopropyl) - 5,11 - dihydro - 10H - dibenzo[a,d]cyclohepten - 10-one; 5-methyl-11-(3-dimethylaminopropyl)-5,11 - dihydro-10H-dibenzo[a,d]cyclohepten-10-one; 11-(3 - methylaminopropyl)-5,11-dihydro-10H-dibenzo[a,d] cyclohepten - 10 - one and 8-chloro-11-(3-methylaminopropyl) - 5,11 - dihydro - 10H-dibenzo[a,d]cyclohepten-10-oneantagonize reserpine blepharospasm in rats and reverse the tetrabenazine catatonia and motor retardation. Further they potentiate the effect of norepinephrine on the nictitating membrane in cats, prolong and augment amphetamine hyperthermia in rats, and demonstrate good antihistaminic activities. All these properties are characteristic for clinically active antidepressant compounds. The test substances are virtually free from anticholinergic properties and therefore the unpleasant atropine-like side effects of the proprietary antidepressants are absent. The agents mentioned can be administered orally or parenterally in the form of aqueous solutions of their salts. The clinically used doses will be from 10 to 200 mg.

The acute toxicity ($Dl_{50}$) is in the same range as that of already known antidepressives.

There is no known objection to combine the drugs according to this application with other psychotropic or somatotropic agents except MAO-inhibitors.

This invention contemplates a method for producing anti-depressant effects which comprises administering to patients suffering from mental disorders a therapeutic dose of a compound of Formula I.

Also contemplated by this invention is a composition for use to produce anti-depressant effects comprising a pharmaceutical carrier and a compound of Formula I in the method described above, in dosage unit forms acceptable for internal administration.

The following examples further illustrate the production of the new compounds of Formula I and of hitherto undescribed intermediate products, but they in no way limit the scope of the invention. The temperatures are given in degrees centigrade.

Example 1

52 g. (0.25 mol) of 5,11-dihydro-10H-dibenzo[a,d] cyclohepten-10-one are dissolved in 420 ml. of absolute benzene and a suspension of 4.6 g. (0.2 mol) of lithium amide in 13.8 ml. of absolute toluene is added. The mixture is refluxed for 2 hours, then cooled to 50°, 30 g. of freshly distilled 3-dimethylamino-propyl chloride (0.25 mol) are added and the whole is refluxed for 20 hours. The reaction mixture is cooled to 20°, 100 ml. of water are added, the organic phase is separated and extracted with 2 N hydrochloric acid. The hydrochloric acid extracts are heated for 30 minutes at 80–90° in order to cleave the basic enol ether formed at the same time. The reaction mixture is then cooled to 20° whereupon the neutral cleavage product, 5,11-dihydro-10H-dibenzo [a,d]cyclohepten-10-one crystallises. The crystals are filtered off and washed with 2 N hydrochloric acid and the combined acid filtrates are made alkaline with concentrated ammonia. The alkaline phase is extracted with ether, the ethereal solution is washed with water, dried over potassium carbonate and evaporated. Distillation of the residue under high vacuum yields 11-(3-dimethylaminopropyl) - 5,11 - dihydro - 10H-dibenzo[a,d]cyclohepten-10-one, B.P. 172–175°/0.005 torr. The base is converted into the hydrochloride with ethanolic hydrochloric acid. This melts at 194–196° on recrystallisation from absolute ethanol.

Example 2

The following compounds are obtained analogously to Example 1 from 5,11-dihydro-10H-dibenzo[a,d]cyclohepten-10-one:

(a) With 3-piperidinopropyl chloride, 11-(3-piperidinopropyl) - 5,11 - dihydro - 10H - dibenzo[a,d]cyclohepten-10-one, B.P. 192–195°/0.006 torr; hydrochloride M.P. 225–228° from abs. ethanol;

(b) With 2-dimethylaminoethyl chloride, 11-(2-dimethylaminoethyl - 5,11 - diyhdro - 10H - dibenz[a,d] cyclohepten-10-one, B.P. 160–164°/0.002 torr; hydrochloride M.P. 200–204° from isopropanol; and (c) With 2-diethylaminoethyl chloride, 11-(2-diethylaminoethyl) - 5,11 - dihydro - 10H - dibenzo[a,d]cyclohepten-10-one, B.P. 162–166°/0.002 torr; hydrochloride M.P. 169–173° from acetone.

Example 3

62.4 g. (0.3 mol) of 5,11-dihydro-10H-dibenzo[a,d] cyclohepten-10-one are dissolved in 200 ml. of absolute toluene. A solution of free 2-dimethylamino-2-methylpropyl chloride in 300 ml. of toluene, which has been freshly prepared from 64.5 g. of hydrochloride (0.37 mol), is added dropwise to this solution, the addition being made within 1 hour at 80–90°. A suspension of 8.05 g.

(0.36 mol) of lithium amide in 24 ml. of absolute toluene is added dropwise simultaneously. On completion of the addition, the reaction mixture is refluxed for 20 hours, then cooled to 20° and 200 ml. of water and 100 ml. of concentrated hydrochloric acid are added. In order to cleave the enol ether formed at the same time, the suspension is heated for 30 minutes at 85–90°, then cooled to 20° and the organic phase is removed and washed with water. The pH of the combined aqueous phases is adjusted to 10 with concentrated ammonia whereupon they are extracted with benzene. The benzene extract is dried over magnesium sulphate and evaporated in vacuo at 40°. The residue is distilled under high vacuum. The 11-(3-dimethylamino-2-methylpropyl) - 5,11 - dihydro - 10H-dibenzo[a,d]cyclohepten-10-one obtained boils at 170–180°/0.01 torr. The distilled base is crystallised from petroleum ether/ether, M.P. 78–81°.

Example 4

1 - [3 - (5,11 - dihydro - 10 - oxo - 10H-dibenzo[a,d] cyclohepten-11-yl)-propyl]-4-methyl piperazine is produced analogously to Example 3 from 62.4 g. of 5,11-dihydro-10H-dibenzo[a,d]cyclohepten-10-one with 1-(3-chloropropyl)-4-methylpiperazine.

The reaction mixture is worked up by adding 200 ml. of water and 150 ml. of concentrated hydrochloric acid. The enol ether formed at the same time with the desired product, is split off by heating the suspension obtained for 30 minutes at 85–90°. It is then cooled to 20° and the organic phase is separated and washed with water. The combined aqueous phases are adjusted to pH 10 with concentrated ammonia and extracted with benzene/methylene chloride. The organic phase is dried over magnesium sulphate and the solvent is removed in vacuo. The partly crystallised residue is taken up in benzene and purified with activated charcoal Darco G 60 (registered trademark). The benzene solution is evaporated in vacuo, the residue is taken up in ether and maleic acid is added. The crude dimaleate obtained is recrystallised from ethanol/acetic acid ethyl ester whereupon the 1-[3-(5,11-dihydro - 10 - oxo - 10H - dibenzo[a,d]cyclohepten-11-yl)-propyl]-4-methyl piperazine dimaleate melts at 173–175°.

Example 5

72.8 g. (0.3 mol) of 8-chloro-5,11-dihydro-10H-dibenzo[a,d]cyclohepten-10-one are dissolved in 300 ml. of absolute benzene. A solution of free 2-dimethylaminoethyl chloride in 400 ml. of benzene which has been freshly prepared from 51.6 g. (0.36 mol) of hydrochloride is added dropwise to this solution within 1 hour at 80–90°. At the same time, a suspension of 8.05 g. (0.36 mol) of lithium amide in 24 ml. of absolute toluene is added dropwise. On completion of the addition, the reaction mixture is refluxed for 20 hours, cooled to 20° and 200 ml. of water and 100 ml. of concentrated hydrochloric acid are added. In order to split off the enol ether formed at the same time, the suspension is heated for 30 minutes at 85–90°. It is then cooled to 20°, the organic phase is removed and washed with water. The combined aqueous phases are adjusted to pH 10 with concentrated ammonia and extracted with benzene/methylene chloride (90:10). The organic extract is dried over magnesium sulphate and evaporated in vacuo at 40°. The residue is chromatographed by the elution method on a column of 250 g. of Florisil (registered trademark of the Floridin Company). The fractions eluted with benzene/chloroform (1:1) are evaporated to dryness in vacuo and the free base obtained is converted in acetone into the hydrochloride with etheral hydrochloric acid. Recrystallisation from acetone/ethanol and ether yields pure 8-chloro-11-(2-dimethylaminoethyl) - 5,11 - dihydro - 10H - dibenzo[a,d]cyclohepten-10-one hydrochloride which melts at 236–238°.

The starting material, 8-chloro-5,11-dihydro-10H-dibenzo[a,d]cyclohepten-10-one is produced in the following manner:

(a) 150 g. of zinc dust, 300 ml. of concentrated ammonia, 150 ml. of water and 6 ml. of saturated copper sulphate solution are heated to 80° and a solution of 50 g. of o-(p-chlorobenzoyl)-benzoic acid in 100 ml. of absolute ethanol is added dropwise to this mixture within 30 minutes while stirring well. The suspension is stirred for another 30 hours, the temperature is kept at 85–90° and ammonia gas is continuously introduced. The hot reaction mixture is then filtered over Celite (registered trade name), the filter residue is boiled with 2 N ammonia and the suspension is again filtered. Concentrated hydrochloric acid is added to the combined filtrates until the reaction is acid to congo paper, the precipitate formed is filtered off, dissolved in 2 N sodium carbonate solution to purify it, the solution is filtered and concentrated hydrochloric acid is added. The precipitate formed is filtered off under suction, washed with water and dried in vacuo at 60°. The α-(p-chlorophenyl)-o-toluic acid obtained melts at 128–129°.

(b) 804 g. of the acid obtained according to 5(a), 300 ml. of ethanol, 3 litres of benzene and 40 ml. of concentrated sulphuric acid are refluxed for 20 hours and the water formed in the reaction is distilled off azeotropically. After cooling to room temperature, the reaction solution is washed with water, 2 N sodium carbonate solution and again with water, dried over sodium sulphate and evaporated. The residue is distilled under high vacuum; the α-(p-chlorophenyl)-o-toluic acid ethyl ester boils at 140–145°/0.01 torr.

(c) A solution of 138 g. (0.05 mol) of the ester obtained according to 5(b) in 800 ml. of absolute ether is added dropwise to a refluxing suspension of 12.4 g. (0.325 mol) of lithium aluminum hydride in 500 ml. of absolute ether. On completion of the dropwise addition, the reaction mixture is refluxed for another 16 hours, then cooled to 20° and 50 ml. of water and 12.5 ml. of 15% sodium hydroxide solution (percent by weight) are added. The precipitate formed is filtered off over Celite (registered trademark) and extracted with boiling methylene chloride. The combined filtrates are dried over sodium sulphate, evaporated in vacuo and the residue is distilled under high vacuum. The o-(p-chlorobenzyl)-benzyl alcohol boils at 150–160°/0.01 torr.

(d) 1325 g. of the alcohol obtained according to 5(c) and 3.4 litres of concentrated hydrobromic acid are refluxed for 3 hours. After cooling to room temperature, the precipitate formed is filtered off, washed well with water and dissolved in ether. The ethereal solution is washed with water, 1 N sodium hydrogen carbonate solution and water until neutral, dried over sodium sulphate and evaporated in vacuo. The residue is crystallised from ether/petroleum ether. The α-bromo-o-(p-chlorobenzyl)-toluene obtained melts at 58–59°.

(e) 1657 g. (5.6 mol) of the bromide obtained according to 5(d) are melted and the melt is added dropwise within 40 minutes at 80° to a well stirred solution of 730 g. of sodium cyanide (14.9 mol) in 685 ml. of water and 1.5 litres of ethanol. The reaction mixture is refluxed for 5 hours and then 1.5 litres of ethanol are distilled off. The residue is cooled to 20°, 2 litres of ether are added to the suspension and the aqueous phase is separated. The organic phase is washed well with water, dried over sodium sulphate and evaporated in vacuo. The residue is distilled under high vacuum whereupon the [α-(p-chlorophenyl)-o-tolyl]-acetonitrile boils at 140–145°/0.01 torr.

(f) 1350 g. of the cyanide obtained according to 5(e), 1.15 litres of 50% potassium hydroxide solution (percent by weight) and 3 litres of ethanol are refluxed for 16 hours until the development of ammonia is completed. 2 litres of ethanol are then distilled off from the reaction mixture and the residue is poured onto 2 kg. of ice. Concentrated hydrochloric acid is added to the mixture until the reaction is acid to congo paper. The precipitate formed is filtered off, washed with water and dried in vacuo at 60°. After recrystallisation from benzene/petroleum ether, the [α-(p-chlorophenyl)-o-tolyl]-acetic acid obtained melts at 139–141°.

(g) 700 g. of the acid obtained according to 5(f) are added in portions at 95° to 5 kg. of polyphosphoric acid and the reaction mixture is stirred for 2 hours at 130°. The melt obtained is poured into 10 litres of water. A crystalline precipitate is formed which is filtered off, washed with water and taken up in methylene chloride. The methylene chloride solution is washed with 2 N sodium carbonate solution and water until the reaction is completely neutral; this neutral solution is dried over sodium sulphate and evaporated in vacuo. The residue is distilled under high vacuum. The 8-chloro-5,11-dihyro-10H-dibenzo[a,d]cyclohepten-10-one boils at 160–180°/0.01 torr. After crystallisation from benzene/petroleum ether, the compound melts at 104–106°.

Example 6

8-chloro-11-(3-dimethylaminopropyl) - 5,11 - dihydro-10H-dibenzo[a,d]cyclohepten-10-one is produced analogously to Example 1 starting from 8-chloro-5,11-dihydro-10H-dibenzo[a,d]cyclohepten-10-one with 3 - dimethylaminopropyl chloride; B.P. 180–200°/0.05 torr. The free base is converted into the hydrochloride; M.P. 171–175° from ethanol/ether.

Example 7

Starting from 48.4 g. (0.2 mol) of 2-chloro-5,11-dihydro-10H-dibenzo[a,d]cyclohepten-10-one with 24.2 g. (0.2 mol) of 3-dimethylaminopropyl chloride, 2-chloro-11-(3-dimethylaminopropyl)-5,11-dihydro-10H - dibenzo[a,d]cyclohepten-10-one and the corresponding hydrochloric salt is obtained analogously to Example 1.

The starting material, 2-chloro-5,11-dihydro-10H-dibenzo[a,d]cyclohepten-10-one, is prepared by starting from the known compound 2-benzoyl-5-chlorobenzoic acid (M.P. 172–174°), analogously to Examples 5(a) to (g), whereby the following intermediate compounds are obtained:

5-chloro-α-phenyl-o-toluic acid;
5-chloro-α-phenyl-o-toluic acid ethyl ester;
2-benzyl-5-chloro-benzylalcohol;
α-bromo-2-benzyl-5-chloro-toluene;
(5-chloro-α-phenyl-o-tolyl)-acetonitrile; and
(5-chloro-α-phenyl-o-tolyl)-acetic acid.

Example 8

Starting from 5-methyl-5,11-dihydro-10H-dibenzo[a,d]cyclohepten-10-one with dimethylaminopropyl chloride, 5-methyl-11-(3-dimethylaminopropyl) - 5,11 - dihydro-10H-dibenzo[a,d]cyclohepten-10-one is prepared analogously to Example 5. The oxalate is obtained from the free base with ethereal oxalic acid solution, M.P. 170–174°.

In analogy to the above-mentioned example, 5-methyl-11-(3-diethylaminopropyl)-5,11-dihydro-10H - dibenzo[a,d]cyclohepten-10-one can be prepared.

Example 9

22 g. (0.075 mol) of 11-(3-dimethylaminopropyl)-5,11-dihydro-10H-dibenzo[a,d]cyclohepten-10-one, which has been produced according to Example 1, are dissolved in 100 ml. of benzene. A solution of 8.73 g. (0.082 mol) of cyanogen bromide in 500 ml. of absolute benzene is added dropwise to this solution, the addition being made within 30 minutes while stirring well at 20–25°. The reaction mixture is refluxed for 2 hours, cooled to 20° and extracted with 50 ml. of 3 N citric acid solution. The organic phase is washed with water, dried over magnesium sulphate and evaporated in vacuo. The crude N-[3-(5,11-dihydro - 10 - oxo - 10H-dibenzo[a,d]cyclohepten-11-yl)-propyl]-N-methyl cyanamide obtained is suspended in 200 ml. of 1 N hydrochloric acid and the mixture is refluxed for 20 hours while stirring well. It is then cooled to 20°, the pH is adjusted to 10 with concentrated ammonia and it is extracted with benzene. The benzene extract obtained is extracted with 3 N citric acid, the pH of the acid, aqueous extracts is adjusted to 10 with concentrated ammonia and then extracted with benzene. The benzene solution is dried over magnesium sulphate and evaporated at 40° in vacuo. The residue is taken up in acetone and neutralised with 6 N ethanolic hydrochloric acid. After adding acetic acid ethyl ester, 11-(3-methylaminopropyl)-5,11-dihydro-10H-dibenzo[a,d]cyclohepten-10-one hydrochloride crystallises; it melts at 145–147°.

Example 10

Starting from 8-chloro - 11 - (3-dimethylaminopropyl)-5,11-dihydro - 10H - dibenzo[a,d]cyclohepten-10-one (cf. Example 6), N-[3-(8-chloro - 5,11 - dihydro-10-oxo-10H-dibenzo[a,d]cyclohepten-11-yl)-propyl]-N-methyl cyanamide is obtained with cyanogen bromide (analogously to Example 9). It is converted with hydrochloric acid into 8-chloro-11-(3-methylaminopropyl) - 5,11 - dihydro-10H-dibenzo[a,d]cyclohepten - 10 - one, M.P. 118–121° from ethanol/ether.

We claim:
1. A compound of the formula:

wherein each of X and Y is hydrogen or chloro;

Z is hydrogen or methyl;
A is alkylene of from 2 to 5 carbon atoms;
$R_1$ is hydrogen or lower alkyl; and
$R_2$ is lower alkyl; or
$R_1$ and $R_2$ taken together with the nitrogen atom to which they are attached are pyrrolidino, piperidino, hexahydro-1H-azepin - 1 - yl, 4-methylpiperazino or 4-methyl-hexahydro-1H-1,4-diazepin-1-yl.

2. The pharmaceutically acceptable acid addition salts of a compound according to claim 1.

3. A compound as defined in claim 1, wherein X and Y are hydrogen or chlorine; Z is hydrogen or methyl; A is propylene; $R_1$ is hydrogen or lower alkyl; and $R_2$ is lower alkyl.

4. The compound as defined in claim 1, wherein X is chlorine; Y is hydrogen; Z is hydrogen; A is propylene; and $R_1$ and $R_2$ are methyl.

5. The compound as defined in claim 1, wherein X and Y are hydrogen; Z is methyl; A is propylene; and $R_1$ and $R_2$ are methyl.

6. The compound as defined in claim 1, wherein X, Y and Z are hydrogen; A is propylene; $R_1$ is hydrogen; and $R_2$ is methyl.

7. The compound as defined in claim 1, wherein X and Z are hydrogen; Y is chlorine; A is propylene; $R_1$ is hydrogen; and $R_2$ is methyl.

8. The compound as defined in claim 1, wherein X and Y are hydrogen; Z is methyl; A is propylene; and $R_1$ and $R_2$ are ethyl.

9. The compound as defined in claim 1, wherein X, Y and Z are hydrogen; A is ethylene; and $R_1$ and $R_2$ are methyl.

10. The compound as defined in claim 1, wherein X, Y and Z are hydrogen; A is propylene; and $R_1$ and $R_2$ together with the adjacent nitrogen are 4-methylpiperazine.

11. The compound as defined in claim 1, wherein X, Y and Z are hydrogen; A is propylene; and $R_1$ and $R_2$ are methyl.

(References on following page)

References Cited

UNITED STATES PATENTS

| | | | |
|---|---|---|---|
| 2,732,373 | 1/1956 | Steiger | 260—279 |
| 3,073,847 | 1/1963 | Doebel et al. | 260—268 X |
| 3,126,411 | 3/1964 | Rey-Bellet et al. | 260—268 X |
| 3,326,898 | 6/1967 | Schindler et al. | 260—268 X |

OTHER REFERENCES

Chem. Abst., vol 65, Col. 8876-7 (1966), Abstracting Dutch Specification 6,512,129.

Corts et al.: Rec. Trav. Chim., vol. 85, p. 3894, Abstracted in Chem. Abstr., vol. 65, 3813 (1966).

NICHOLAS S. RIZZO, Primary Examiner

D. G. DAUS, Assistant Examiner

U.S. Cl. X.R.

260—239, 293, 326.81, 570.5, 590; 424—232, 250